United States Patent [19]

Bruna et al.

[11] 4,427,211
[45] Jan. 24, 1984

[54] GRAIN DRILL TRAILER

[76] Inventors: Charles Bruna; Lynn Bruna, both of Rte. 4, Marysville, Kans. 66508

[21] Appl. No.: 389,176

[22] Filed: Jun. 17, 1982

[51] Int. Cl.³ .............................................. B60P 3/06
[52] U.S. Cl. ...................................... 280/402; 111/1; 172/240; 414/481
[58] Field of Search .............. 280/402, 404, 423 B, 280/476 R, 47.13 R, 43.23; 111/1, 52, 85; 172/240, 242, 244; 414/481, 482, 483

[56] References Cited

U.S. PATENT DOCUMENTS

| | | | |
|---|---|---|---|
| 188,001 | 3/1877 | Cashman | 280/47.13 |
| 1,368,619 | 2/1921 | Fleury | 280/35 |
| 1,693,869 | 12/1928 | Ronk | 280/405 R |
| 2,599,366 | 6/1952 | Bohnenblust | 280/423 B |
| 3,013,683 | 12/1961 | Harris | 414/481 |
| 3,169,650 | 2/1965 | Soyland | 280/402 X |
| 3,322,292 | 5/1967 | Bogh et al. | 414/563 |
| 3,510,016 | 5/1970 | Wolff et al. | 280/423 B |
| 3,640,192 | 2/1972 | Mauldin | 280/43.23 |
| 3,653,680 | 4/1972 | Denny | 280/402 X |
| 3,949,976 | 4/1976 | Cofer | 280/47.15 |
| 4,081,090 | 3/1978 | Hopkins | 280/402 X |
| 4,147,373 | 4/1979 | Cully | 280/445 |

Primary Examiner—John A. Pekar
Attorney, Agent, or Firm—Schmidt, Johnson, Hovey & Williams

[57] ABSTRACT

Cargo in the nature of a farm machine, such as a grain drill, is combined with transport structure in the form of a mobile carrier to improve upon over-the-road travel and other movement in a manner to permit rolling support by the ground wheels of both the carrier and the machine during the towing operation. The carrier has a normally inclined bed to facilitate loading of the machine thereupon. Power means, for example, that with which the machine is equipped to control depth, is then used to raise the lower end of the carrier off the ground prior to coupling the carrier-machine unit with a tractor or other towing vehicle.

11 Claims, 7 Drawing Figures

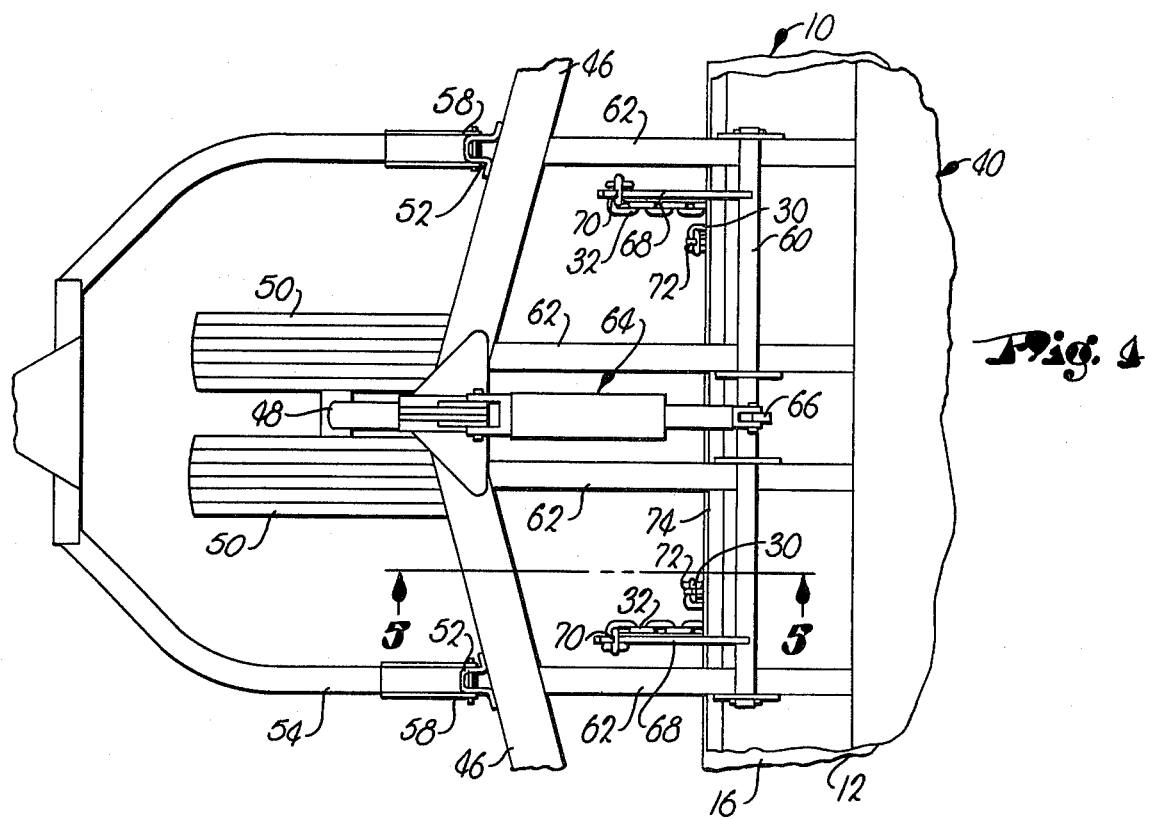
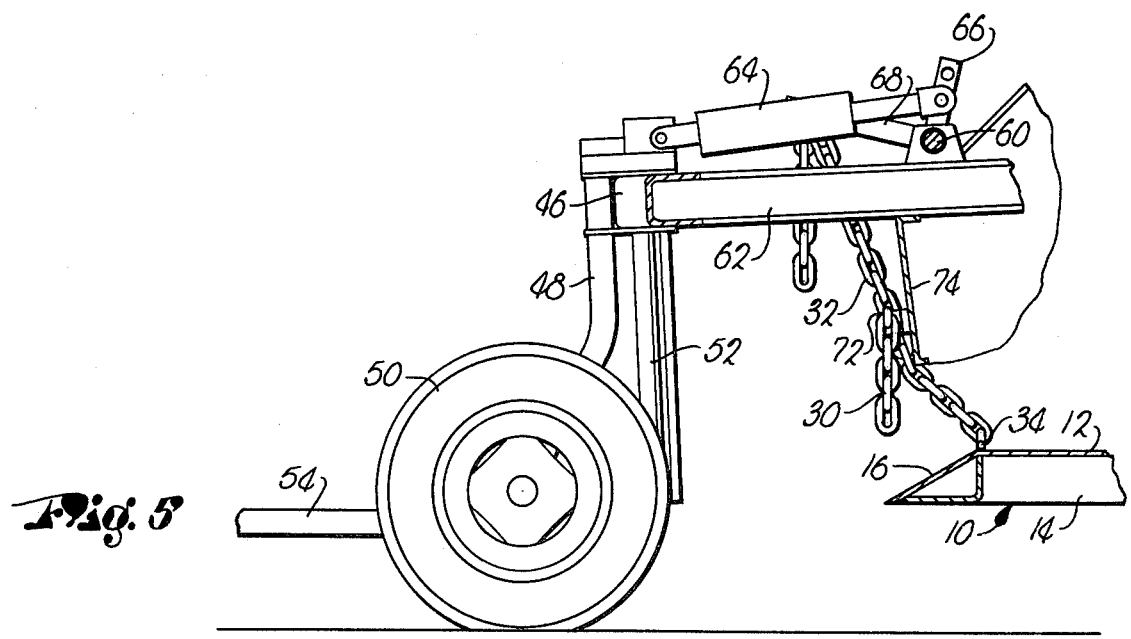

GRAIN DRILL TRAILER

Still in use today, in the agricultural field particularly, are machines which are towed behind tractors as distinguished from those which are either self-propelled or carried by the tractor. Oftentimes, it becomes necessary to travel long distances into and out of fields and/or over the road before and after the machines are placed in use. Towing is not always satisfactory and it is common practice in many instances to load and unload the machines on and off trailers or trucks for transport purposes.

The costs for transport equipment, by ownership or by hire, is not always feasible, especially in small farm operations or instances where not many machines are involved. The problems are enhanced in the case of relatively large, heavy, bulky implements such as modern day grain drills.

According to our present invention, therefore, there is provided a relatively small, light weight, inexpensive, wheeled bed that can be placed in an inclined position with one end resting on the ground to permit simple and rapid loading of the machine onto the bed in ramp-like fashion toward the opposite end held elevated by the wheels of the bed. Ground wheels forming a part of the machine are left resting on the ground at the lower end of the bed.

Thereupon, through use of power mechanism, the lower end of the bed is raised off the ground to place it in a position supported by the machine in suspension therefrom. Thus, when the carrier-machine unit is placed in tow, support is provided by both the wheels of the carrier and of the machine remaining in rolling contact with the ground, inasmuch as the weight of the machine is partially on the bed and partially on the wheels of the machine.

The grain drill to which our carrier is especially adapted is provided with powered mechanism used to control the depth of its furrow-opening discs, and we take advantage of that mechanism to raise the carrier bed as above explained. The press wheels of the drill rest on the bed during transport. Additionally, by use of an auxilliary suspension for safety purposes, the openers may also be lowered onto the bed before towing commences.

IN THE DRAWINGS

FIG. 4 is an enlarged, fragmentary, top plan view of the machine and its carrier;

FIG. 5 is a cross-sectional view taken on line 5—5 of FIG. 4;

Figure 2:
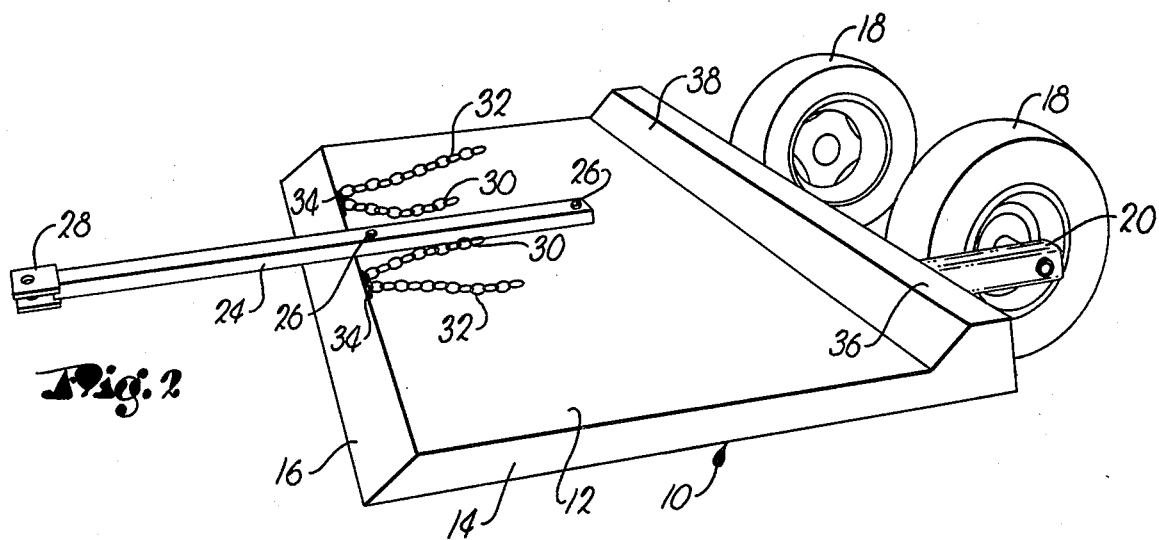
FIG. 2 is a top perspective view of the carrier prior to loading of the machine thereon.
Figure 3:
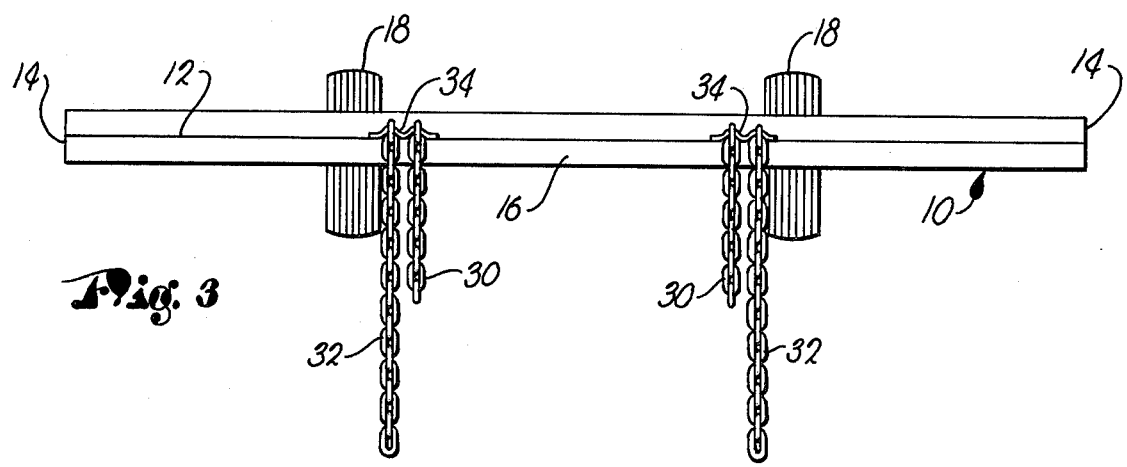
FIG. 3 is a front elevational view of the carrier.
Figure 7:
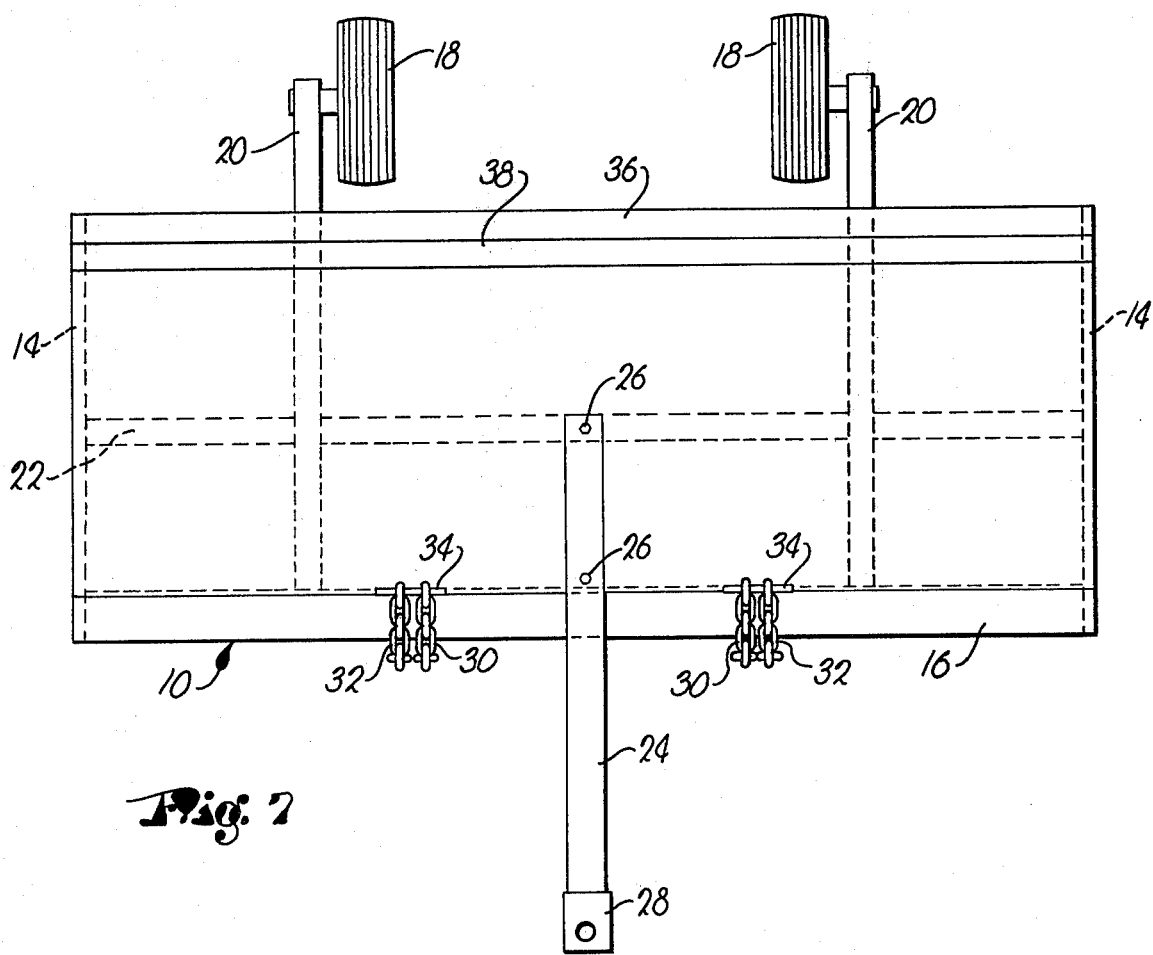
FIG. 7 is a top plan view of the carrier showing its underlying framework in phantom.

Referring particularly to FIGS. 2, 3 and 7 of the drawings, transport structure in the nature of a mobile, trailer-like carrier, broadly designated by the numeral 10, has a flat, rectangular bed 12 provided with a pair of sides 14, the front end of the bed 12 being defined by an elongated, transversely triangular ramp 16 spanning the distance between the sides 14.

The carrier 10 has a pair of rear, laterally spaced, ground wheels 18 rotatably mounted on elongated parallel arms 20 which are spaced inwardly of the sides 14 and serve as reinforcements for the bed 12 along with a beam 22 extending between the sides 14. A draft bar 24, releasably secured to the bed 12 by fasteners 26, extends forwardly beyond the ramp 16 and has a hitch 28 adapted for coupling with a towing vehicle. A pair of inner chains 30 and a pair of outer chains 32 are attached by loops 34 to the bed 12 adjacent the ramp 16. The rear end of the carrier 10 is provided with an elongated abutment 36 rising above the bed 12, spanning the distance between the sides 14 and provided with a front surface 38 throughout its length that slopes downwardly and forwardly as the bed 12 is approached.

A grain drill 40, provided with a series of furrow-opening disks 42 and a series of trailing press wheels 44 thereacross, has a forwardly-extending, V-shaped frame portion 46, at the apex of which depends a caster spindle 48 for a pair of front ground wheels 50. A pair of laterally spaced hangers 52 depend from the frame 46 and a U-shaped tongue 54, provided with a hitch 56, is looped around the wheels 50 and connected to the hangers 52 by hinges 58.

The drill 40 has a transverse rockshaft 60 on a series of forwardly extending frame members 62 operably connected with the disks 42 to control the depth of soil penetration thereof through use of a fluid pressure cylinder and piston assembly 64 carried by the frame 46 and coupled with a center crank 66 rigid to the rockshaft 60.

Each of a pair of additional cranks 68, extending radially from the rockshaft 60, is provided with a hook 70 adapted to receive a corresponding chain 32, and a pair of hooks 72 are mounted on a front wall 74 of the drill 40 for receiving the chains 30.

OPERATION

By use of the hitch 28, the carrier 10 may be tractor-towed to the site of the drill 40 to be transported, whereupon the fasteners 26 are released and the tongue 24 is removed. The hitch 56 is then coupled with the tractor drawbar and the drill 40 backed toward the carrier 10.

Figure 6:
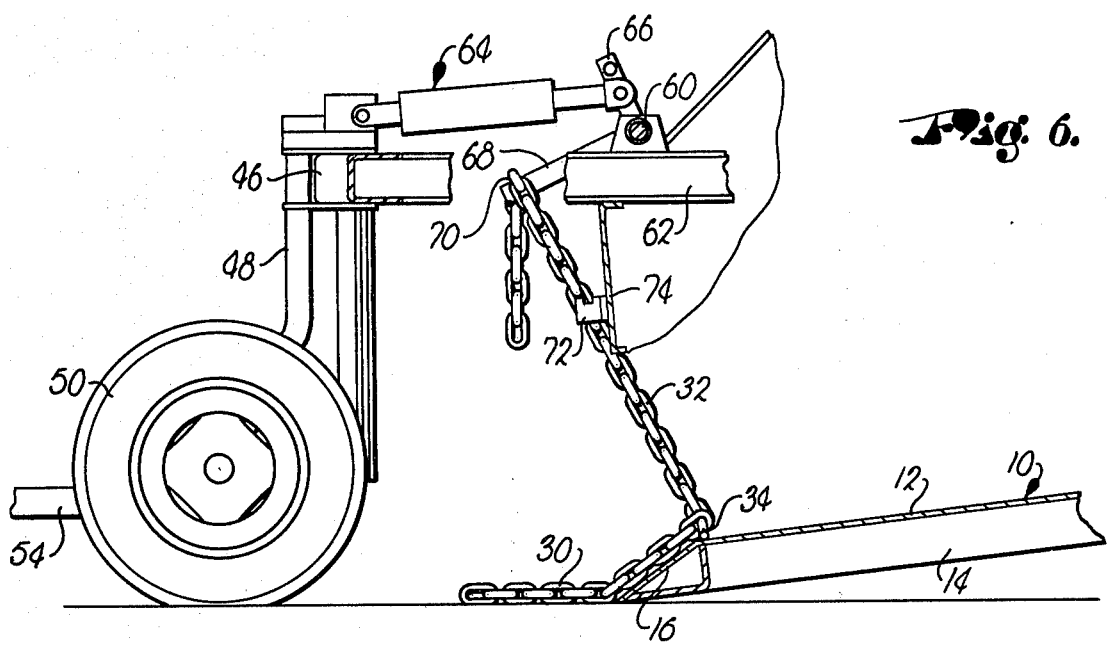
FIG. 6 is a view similar to FIG. 5 showing the carrier unraised.

With the ramp 16 resting on the ground and the bed 12 inclined upwardly and rearwardly from the ramp 16 (FIG. 6) and with the disks 42 raised, the press wheels 44 roll easily up the ramp 16 and along the bed 12 until they come into engagement with the surface 38 of the abutment 36. At this time the wheels 50 remain on the ground spaced forwardly of ramp 16 (FIG. 6).

Then the operator lowers the cranks 68 to lower the disks 42 onto the bed 12. He then connects the chains 32 with the hooks 70 of the cranks 68, following which the piston rod of the assembly 64 is extended from the position shown in FIG. 6 to swing the crank 66 rearwardly and to raise the cranks 68. This raises the disks 42 off the bed 12 and raises the front end of the bed 12 as it swings about the axles of the wheels 18, all as is clearly depicted in FIG. 5.

At this juncture, it is desirable, for safety reasons, to connect the chains 30 with the hooks 72 so that, in the event of loss of fluid pressure for supporting the front of the carrier 10 through the assembly 64, the ramp 16 does not drop during transport. The operator may even retract the piston of the assembly 64 to lower the disks 42 onto the bed 12.

With the front end of the carrier 10 thus suspended from the drill 40, the latter is restrained against rearward movement on the bed 12 by the abutment 36 and against forward movement on the bed 12 by the chains 30 or by both pairs of chains 30 and 32 if desired. The drill-carrier unit may now be towed to and from the site of use, or otherwise, with complete safety as the wheels 18 and 50 roll along, with the castering of the wheels 50 permitting even the shortest of turning. Loading and unloading of the drill 40 is a one man operation and can be performed easily and quickly, requiring no assistance, special skills or auxiliary equipment.

The distance between the sides 14 need be no greater than the width of the drill 40, permitting passage through gates and along narrow roads the same as if the drill were pulled directly without the aid of the carrier 10. However, now it is possible to travel longer distances over rough terrain at higher speeds without damage to the drill 40, a task not made possible when the drill 40 is supported under tow by the caster wheels 50 and the press wheels 44, all in rolling contact with the ground.

Figure 1:
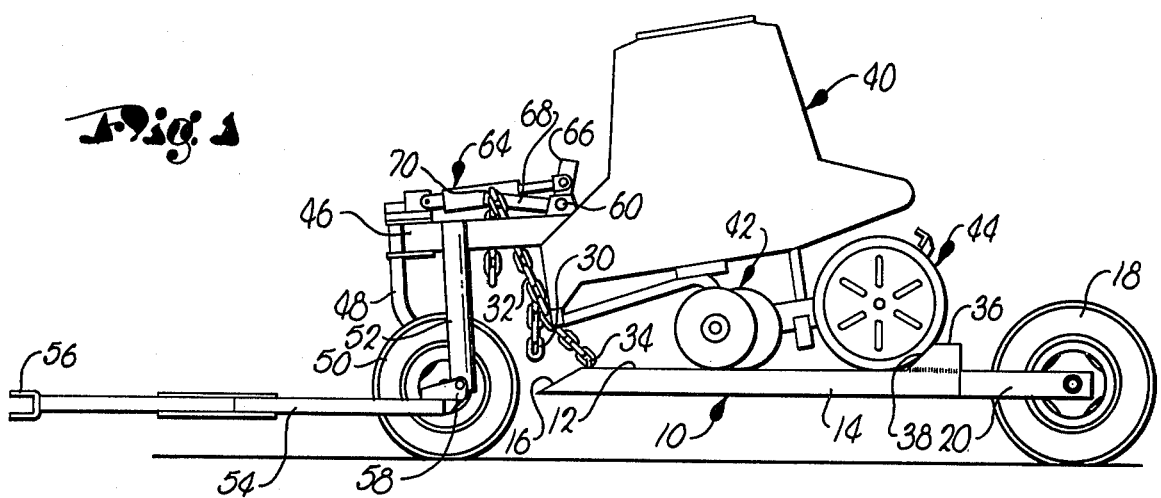
FIG. 1 is a side elevational view of a combination machine and carrier made in accordance with our present invention.

Eliminated is the need for large, heavy and expensive hauling vehicles such as trucks, semi-trailers and specially made apparatus, it being understood that drill 40 has been selected for illustrative purposes only; the carrier 10 is adapted to transport many other types of wheeled cargo in the manner shown in FIG. 1 whether or not for agricultural use.

We claim:

1. In combination with a machine having a towing tongue, front wheel means and raising and lowering mechanism provided with power means, transport structure for said machine comprising:
    a machine-receiving bed having a pair of sides, a front end and a rear end,
    said bed being provided with rear wheel means; and
    means on the bed attachable to said mechanism for raising said front end in response to operation of said power means after loading of the machine upon the bed with the front wheels remaining on the ground whereby, upon coupling said tongue with a towing vehicle, the bed and the machine thereon may be placed in tow as a unit, supported by said front and rear wheel means.

2. The invention of claim 1, and means for suspending said front end from the machine upon depowering of said power means.

3. The invention of claim 1; and abutment means on the bed at said rear end engaged by the machine when it is on the bed.

4. The invention of claim 1; and ramp means on the bed along said front end whereby the machine may be rolled onto the bed front end to rear end.

5. The invention of claim 1, said rear wheel means having connection with the bed between said sides and rearwardly of said rear end.

6. The invention of claim 1, said mechanism including a rocker shaft having crank means, said attachable means hanging said front end from the crank means.

7. The invention of claim 6; and means for suspending said front end from the machine upon depowering of said power means, said attachable means and said suspending means each including at least one chain and hook assembly.

8. The invention of claim 3; and ramp means on the bed along said front end whereby the machine may be rolled onto the bed front end to rear end into engagement with said abutment means.

9. The invention of claim 8, said machine being a grain drill provided with a series of press wheels resting on the bed against the abutment.

10. The invention of claim 9, said machine having a series of furrow opening discs ahead of the press wheels, depth controlled by said mechanism and resting on the bed upon depowering of said power means.

11. In combination, a machine to be transported and a carrier for said machine,
    said machine being provided with ground wheel means,
    said carrier including a bed having a pair of ends and ground wheel means at one of said ends,
    said bed normally sloping upwardly toward its wheel means with the opposite of said ends resting on the ground; and
    means on the machine for raising said opposite end off the ground after the machine is loaded on the bed while leaving the wheel means of the machine on the ground whereby, upon placement of the machine and carrier under tow as a unit, the wheel means of both the carrier and the machine become rolling supports for said unit.

* * * * *